April 5, 1966  R. T. MERLE  3,244,899
TIME DELAY CIRCUIT CONTROL SYSTEM FOR VEHICLE LIGHTS
Filed April 1, 1963
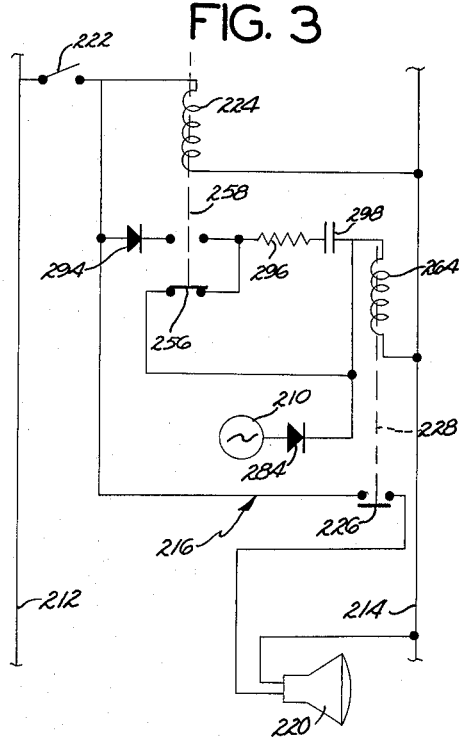
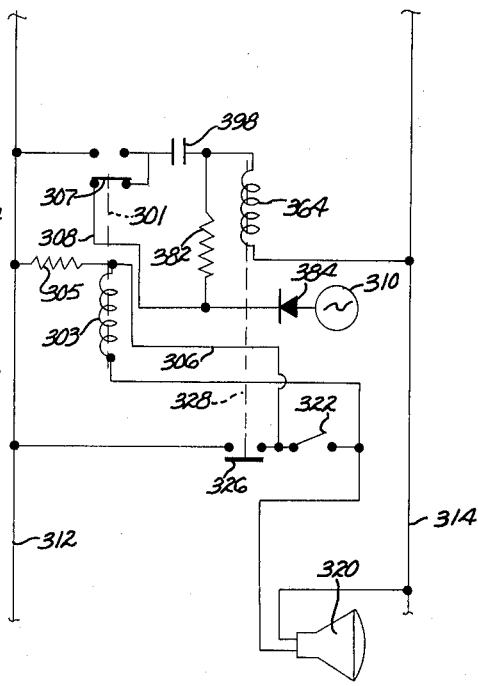
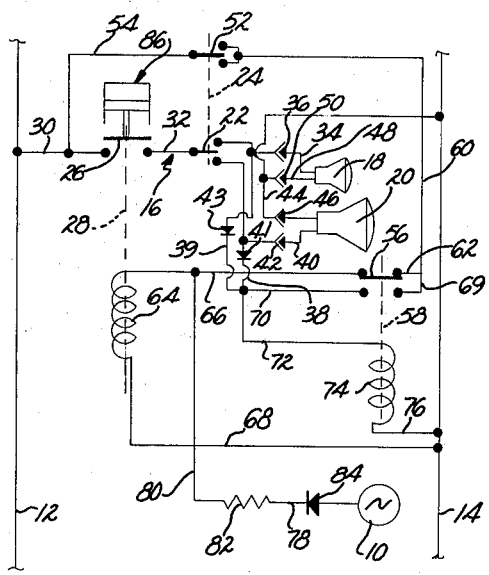
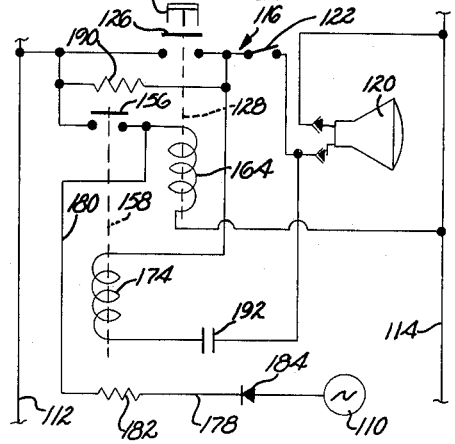
INVENTOR.
RICHARD T. MERLE
BY FULWIDER, PATTON,
RIEBER, LEE & UTECHT
ATTORNEYS

United States Patent Office 3,244,899
Patented Apr. 5, 1966

3,244,899
TIME DELAY CIRCUIT CONTROL SYSTEM
FOR VEHICLE LIGHTS
Richard T. Merle, 1210 W. 144th St., Gardena, Calif.
Filed Apr. 1, 1963, Ser. No. 269,668
3 Claims. (Cl. 307—10)

The present invention relates generally to electrical energizing systems, and more particularly to energizing systems for use in motor vehicles and the like.

Many different types of vehicles are in use today for transporting persons or things from one place to another. Most of such vehicles comprise internal combustion engines as the source of power. Also, virtually all vehicles in use today have their own electrical generating apparatus. That is, since vehicles are necessarily ambulatory by their very nature and purpose, whatever electrical energy is necessary for operating the vehicle and associated apparatus must be transported by the vehicle itself.

Some of the electrically operated devices or apparatus found on present day vehicles are intended to be used only under particular circumstances. For instance, the driving lights of an automobile are necessary only when the automobile is in use. Presently, although such lights are energized by the self contained electrical energizing means, they can be operated even when the automobile is not in use. As a result, the battery of the automobile can easily be harmed and depleted if its electrical energy merely by the driving lights or other electrical device or apparatus being energized while the vehicle is not in use. More specifically, while the automobile is in operation, the electrical energy for such driving lights or apparatus is continually being generated by suitable generating means connected to the motor. However, when the motor is not in operation, or idling at low r.p.m., the energy for such lights must be supplied from the battery.

Although certain energizing systems have heretofore been conceived for rendering the driving lights and other electrical devices of a vehicle inoperable under certain conditions, such systems have not been responsive to a variable which is closely related to the use to be made of such devices. That is, heretofore certain systems have been provided whereby the driving lights of a vehicle are energized in response to operation of the ignition switch of the vehicle. This has been found to be inadequate, since the relationship between the use of the driving lights and the use of the ignition switch is not direct. As such, there frequently arose conditions wherein it was desirable to use the driving lights irrespective of the ignition switch, and at other times it was desirable to maintain the driving lights deenergized regardless of the operation of such switch.

In view of the foregoing, it is an object of the present invention to provide an electrical energizing system for use in vehicles whereby certain electrically energizable devices are energized only under predetermined conditions of operation of the vehicle.

Another object of the present invention is to provide electrical energizing systems for use in a vehicle wherein the electrically energizable devices are energized in accordance with operation of the usual electrical generator found on virtually all motor vehicles.

Another object of the present invention is to provide energizing systems as characterized above which are operable to deenergize the given devices whenever the output of the electrical generator is less than a predetermined amount.

A further object of the present invention is to provide in energizing systems as characterized above time delay means whereby such devices are deenergized only after a predetermined time lapse following termination of a predetermined output of the generator.

A further object of the present invention is to provide energizing systems as characterized above which are operable for controlling the driving lights of a vehicle in accordance with the use normally made of such lights.

An even further object of the present invention is to provide energizing systems as characterized above which are simple and inexpensive to manufacture, and which are rugged and dependable in operation.

The novel features which I consider characteristic of my invention are set forth with particularity in the appended claims. The device itself, however, both as to its organization and mode of operation, together with additional objects and advantages thereof, will best be understood from the following description of specific embodiments when read in connection with the accompanying drawings in which:

FIGURE 1 is a schematic diagram of a first embodiment of the present invention;

FIGURE 2 is a schematic diagram of a second embodiment of the present invention;

FIGURE 3 is a schematic diagram of a third embodiment of the present invention; and FIGURE 4 is a schematic diagram of a fourth embodiment of the present invention.

Referring to FIGURE 1 of the drawings, there is shown therein a first embodiment for illustration of the present invention. Numeral 10 designates an electrical generator of a vehicle (not shown) having an electrical device to be controlled in accordance with operation of such vehicle.

The vehicle is also provided with a battery (not shown), which is illustrated in FIGURE 1 by the electrical conductors 12 and 14. Connected across such conductors is an energizing circuit 16 which comprises a pair of lamps 18 and 20, a movable contactor 22 of a manually operable switch 24, and a contactor 26 of an electromagnetic circuit controlling device or switch 28. Such energizing circuit 16 further comprises a lead wire 30 which connects one stationary contact of contactor 26 to conductor 12. Another lead wire 32 connects the other stationary contact of contactor 26 to one side of contactor 22 of manual switch 24.

A lead wire 34, having suitable connector means 36 is utilized to connect a stationary contact of contactor 22 to one side of lamp 18. A lead wire 40, which is provided with a connector 42, is employed to connect another stationary contact of contactor 22 to one side of lamp 20. A lead wire 44, having a connector 46, is provided from the other side of lamp 20 to conductor 14. A lead wire 48, having a connector 50, connects lamp 18 to lead wire 44.

Manually operable switch 24 also includes another contactor 52, one side of which is connected to lead wire 30 by a lead wire 54. The stationary contact of contactor 52 is connected by means of lead wires 60 and 62 to a stationary contact associated with a contactor 56 of an electromagnetic switch 58. The other stationary contact of contactor 56 is connected to one side of an electromagnetic winding 64 of an electromagnetic switch 28 by a lead wire 66. The other side of winding 64 is connected to conductor 14 by a lead wire 68.

As will hereinafter appear in greater detail, the contactor 56 of switch 58 is provided with two pairs of stationary contacts so as to have two operating or circuit making positions. A lead wire 69 interconnects one of the contacts for contactor 56 with the juncture of lead wires 60 and 62. Another stationary contact for contactor 56 is connected by lead wire 70 to a lead wire 72, the latter of which is connected to one side of an electromagnetic winding 74 of switch 58. The other side of winding 74 is connected to conductor 14 by a lead wire 76.

A lead wire 38 connects lead wire 40 to the juncture of lead wires 70 and 72, while a lead wire 39 is employed to interconnect lead wires 34 and 70. In each of such lead wires there is positioned a unidirectional impedance as at 41 and 43 respectively to limit the direction of current flow therethrough.

The forementioned electrical generator 10 of the vehicle is connected to lead wire 66 through lead wires 78 and 80 and an electrical resistor 82. A unidirectional impedance device 84 is interposed in the lead wire 78.

The contactor 26 of switch 28 is provided with suitable mechanical time delay means as indicated at 86 for delaying the response of contact 26 to deenergization of winding 64. That is, due to such time delay means, the contactor 26 is returned to open circuit position only after a predetermined time lapse following deenergization of winding 64.

The lamps 18 and 20 are intended to represent the parking and driving lights, respectively, of the vehicle. However, as will be readily apparent to those persons skilled in the art, any electrically energizable device can be substituted for the lamps 18 and 20.

The energizing system of FIGURE 1 operates generally as follows.

When it is desired to energize the lamps 18 or 20, or their equivalent, it is merely necessary to operate manual switch 24 so as to move the contactors 22 and 52 to their respective closed circuit positions. Closure of contactor 22, of course, does not complete the energizing circuit 16 for the appropriate one of lamps 18 and 20 because the contactor 26 is, at this time, in open circuit condition.

Closure of contactor 52, however, effects energization of electromagnetic winding 64 through a circuit composed of lead wires 30 and 54, contactor 52, lead wires 60 and 62, contactor 56, lead wire 66, winding 64 and lead wire 68. Thus, winding 64 is energized so as to move contactor 26 into its closed circuit position. When this happens, the appropriate one of lamps 18 and 20 is placed across the conductors 12 and 14 by means of the energizing circuit 16. The completed energizing circuit then comprises lead wire 30, contactor 26, lead wire 32, contactor 22, a first circuit comprising lead wire 34, lamp 18, lead wire 48, and lead wire 44, or a second circuit comprising lead wire 40, lamp 20 and lead wire 44. Thus, the appropriate one of lamps 18 and 20 is properly energized.

Simultaneous with energization of either of said lamps is energization of winding 74 through a circuit leading from contactor 22 through either lead wire 38 or 39 and further comprising lead wire 72, winding 74, and lead wire 76.

Energization of winding 74 moves contactor 56 from its position shown in FIGURE 1 to engagement with the stationary contacts connected to lead wires 69 and 70. Such action of contactor 56 effects deenergization of winding 64. When this happens, the time delay mechanism 86 for contactor 26 commences to operate to hold contactor 26 in closed circuit position for a predetermined interval of time.

Due to the fact that the electrical generator 10 is operatively associated with or connected to the motor or other motive power means for the vehicle, the output of the generator 10 varies in accordance with the operation of such vehicle. That is, if the power plant of the vehicle is caused to operate at a fast rate of speed, as for instance when the vehicle is being operated, the output of generator 10 is relatively high. Conversely, when the power plant is merely idling, then the output of generator 10 is extremely low. By selecting the proper components, switch 28 can be caused to respond only to a predetermined output of generator 10. Thus, winding 64 will hold or move contactor 26 to its closed circuit position only when the vehicle is operating in a predetermined manner. That is, when the vehicle is not in operation and the power plant thereof is merely idling, or off, the output of generator 10 is not sufficient to suitably energize winding 64 to hold contact 26 in closed circuit position. However, when the vehicle is in operation and hence the power plant thereof is operating at a predetermined rate, the output of generator 10 is then sufficient to cause winding 64 to hold contactor 26 closed.

Thus, following the time interval afforded by timing mechanism 86, the contactor 26 is moved to open circuit position unless generator 10 is operating sufficiently to properly energize winding 64 to cause the latter to maintain contactor 26 closed. In this manner, energization of lamps 18 or 20, or any corresponding electrically energizable device, is maintained only if the vehicle is being operated. If not, the lamps 18 or 20 are deenergized.

Movement of contactor 56 in response to energization of winding 74 also establishes a new energizing circuit for such winding. This energizing circuit includes contactor 52 of manual switch 24 and contactor 56 as it interconnects lead wires 69 and 70. Thus, winding 74 is maintained energized even though energizing circuit 16 is interrupted. As a result, contactors 22 and 52 of switch 24 may remain closed so that subsequent operation of the vehicle will cause generator 10 to energize winding 64 sufficiently to complete circuit 16. Such operation is obtained without the contactor 56 continually vacillating or chattering as would result if winding 74 was energizable solely through contactor 26 and contactor 22. The unidirectional impedance devices 41 and 43, of course, prevent lamps 20 and 18 from being energized through the aforementioned circuit comprising contactors 52 and 56.

Unidirectional impedance device 24, of course, operates to insure that current can flow only away from generator 10.

FIGURE 2 shows a second embodiment of the present invention. Therein is shown conductors 112 and 114 across which the energizing circuit 116 is connected for energization of the lamps of a vehicle as represented by lamps 120. An electromagnetic switch 128 having a winding 164 and a contactor 126 is positioned such that the contactor 126 is part of the energizing circuit 116. A manually operable contactor 122 is also included in such energizing circuit.

The electrical generator 110 of the vehicle (not shown) is connected for energization of winding 164, as will hereinafter appear, through a circuit comprising lead wire 178, wherein is positioned a unidirectional impedance device 184, a resistor 182 and a lead wire 180. An electromagnetic relay or switch 158 comprises an electromagnetic winding 174 and a normally open contactor 156 in the energizing circuit of winding 164.

The contactor 126 of electromagnetic switch 128 is provided with a time delay mechanism 186 for controlling the opening movement of contact 126. That is, as with the time delay mechanism 86 of FIGURE 1, the time delay mechanism 186 of FIGURE 2 does not influence closing movement of contact 126 but rather provides a time delay between deenergization of windng 164 and movement of contactor 126 to open circuit position.

A resistor 190 is connected in parallel circuit arrangement with contactor 126 in FIGURE 2. Also, in series circuit relation with winding 174 is an electrical energy storage device or capacitor 192.

The system of FIGURE 2 operates generally as follows. Prior to closure of contactor 122, capacitor 192 is charged to the potential difference between conductors 112 and 114. This is accomplished through a charging circuit which leads from conductor 112 through resistor 190, winding 174, capacitor 192, and the lamp 120 to the other conductor 114. This charging circuit is of such high electrical resistance that insufficient current is permitted to flow therethrough for energization of lamp 120. Also, such current flow is insufficient to cause contactor 156 of electromagnetic switch 158 to be moved to its closed circuit position. Nonetheless, this circuit enables capacitor 192 to become fully charged.

Upon subsequent closure of contactor 122, the energy stored in capacitor 192 flows through a discharge circuit comprising winding 174 and contactor 122. Thus, current flows through winding 174 to cause contactor 156 to be moved to its closed circuit position.

Closure of contactor 156 effects energization of winding 164, which in turn moves contactor 126 to its circuit making position. This latter operation, of course, completes the energizing circuit 116 for the lamps or other electrically energizable devices.

The discharge current from capacitor 192 decays or decreases to a point where insufficient current is passing through winding 174 to maintain contactor 156 in its closed circuit position. Thereupon, such contactor 156 is moved to its open position.

Such action of contactor 156 removes winding 164 from energization by the battery as represented by conductors 112 and 114. Thereafter, energization of winding 164 is dependent solely upon the output of generator 110. If such output is sufficient, winding 164 of electromagnetic switch 128 remains energized so as to maintain energizing circuit 116 completed. On the other hand, if the output of generator 110 is not sufficient, the time delay mechanism 186 ultimately permits contactor 126 to move to its open circuit position. When this happens, of course, the lamps, as represented by lamp 120, are deenergized.

Upon resumption of the operation of the vehicle and corresponding increase in the output of generator 110, winding 164 is reenergized so as to cause contactor 126 to be closed. The time delay mechanism 186, as with respect to mechanism 86 of FIGURE 1, enables the motor or other power source of the vehicle to idle for the duration of the time delay before the lamps are deenergized.

Upon subsequent opening of contactor 122, the capacitor 192 is again charged, as above explained, for subsequent energization of winding 174.

FIGURE 3 of the drawings shows a third embodiment of the present invention. In this arrangement, an energizing circuit 216 for lamps represented by lamp 220, includes a manually operable switch or contactor 222 and a contactor 226 of an electromagnetic switch 228. This energizing circuit, of course, extends between the conductors 212 and 214.

The electromagnetic switch 228 further comprises an electromagnetic winding 264 which is energizable through a circuit comprising a unidirectional impedance device 294, a contactor 256 of an electromagnetic switch 258, a resistor 296 and a capacitor 298. Contactor 256 is provided with two operating or closed circuit positions, and has an electromagnetic winding 274.

The electrical generator 210 of the vehicle (not shown) is also connected in circuit with winding 264 through a unidirectional impedance 284.

The embodiment of FIGURE 3 operates substantially as follows. With manually operable switch 222 in its open circuit condition, capacitor 298 is in its uncharged state due to the fact that contactor 256 is then positioned to complete the discharge path for capacitor 298 as shown in FIGURE 3.

Upon closure of switch 222, winding 224 is connected between the conductors 212 and 214. Such energization of winding 224 causes contactor 256 to complete the circuit for simultaneous charging of capacitor 298 and energization of winding 264. That is, contactor 256 is moved into engagement with the upper stationary contacts, as shown in FIGURE 3, to complete an energizing circuit comprising switch 222, unidirectional impedance 294, contactor 256, resistor 296, capacitor 298 and winding 264. The impedance of this energizing circuit is initially relatively low so that sufficient current is permitted to flow therethrough to cause winding 264 to move contactor 226 into its closed circuit position.

Closure of contactor 226, of course, effects energization of the lamps represented by lamp 220. However, as the capacitor 298 is thus charged, the current flow through winding 264 diminishes until a point is reached where insufficient current is permitted to flow for continued energization of winding 264. This causes contactor 226 to move to its open circuit position so as to de-energize the lamps unless electrical generator 210 affords sufficient energization of winding 264.

Thus, the time delay in actuation of contactor 226 to open circuit position is afforded by the charging time of capacitor 298 as related to the energization characteristics of winding 264. In this manner, the lamps are de-energized a predetermined time following energization thereof unless maintained by generator 210.

FIGURE 4 shows another embodiment of the present invention. In this embodiment, there is provided an electromagnetic switch 301 having an electromagnetic winding 303 in circuit with a resistor 305 and the vehicle lamp 320. Switch 301 further comprises a contactor 307 having two operating or closed circuit positions.

A capacitor 398 is arranged in series circuit relation with both pairs of stationary contacts for contactor 307, and with an electromagnetic winding 364 of an electromagnetic switch 328. This switch further comprises a contactor 326 in parallel with resistor 305. A manually operable switch or contactor 322 is provided in parallel circuit arrangement with winding 303 for purposes to be hereinafter described.

The electrical generator 310 of the vehicle (not shown) is operable to energize winding 364 through a unidirectional impedance 384 and a resistor 382.

The embodiment shown in FIGURE 4 operates generally as follows.

Winding 303 is initially energized by means of a circuit comprising resistor 305 and the lamps represented by lamp 320. The value of resistor 305 is such as to prevent sufficient current to flow through this circuit to effect energization of the lamps. However, sufficient current does flow therethrough to cause winding 303 to move contactor 307 into engagement with its lowermost contacts as shown in FIGURE 4.

With contactor 307 in this position, capacitor 398 is uncharged due to completion of the discharge circuit therefor comprising resistor 382 and contactor 307.

Upon manual closure of contactor 322, winding 303 is shorted out thereby causing contactor 307 to move into engagement with its uppermost contacts. Removal of winding 303, however, does not cause the lamps to become energized because resistor 305 is still in circuit therewith.

Movement of contactor 307 to its uppermost position places capacitor 398 across the power lines 312 and 314 through winding 364. Capacitor 398 thus begins to charge causing current to flow through winding 364 so as to move contactor 326 of electromagnetic switch 328 into its closed circuit position.

The lamps represented by lamp 320 are thus energized since closure of contactor 326 shorts out resistor 305.

Initially, capacitor 398 appears as a short circuit, causing high current flow through winding 364. However, such charging current decays until a point is reached where contactor 326 will return to its open circuit position unless generator 310 continues to energize winding 364 through resistor 382. In the event the output of generator 310 is not sufficient to energize such winding, contactor is returned to open circuit position, and the lamps are thereby deenergized.

It is thus seen that the present invention provides means for controlling an electrically energizable device in accordance with operation of a vehicle. In fact, it is realized that various other methods may be employed for sensing the operation of the vehicles, as for instance a pressure responsive switch operatively associated with the source of power and responsive to the manifold pressure as in the case of an internal combustion engine. Thus, in place of the electrical generator in the above-explained embodiments, the pressure responsive switch can provide the same operation since the manifold pressure of the engine also varies with operation of the vehicle.

Although I have shown and described certain specific embodiments of my invention, I am fully aware that many modifications thereof are possible. My invention, therefore, is not to be restricted except insofar as is necessitated by the prior art and by the spirit of the appended claims.

I claim:
1. A time delay circuit control system for use in combination with a load circuit and first and second sources of electrical energy, said system comprising:
   time delay means in said load circuit operable to connect said load circuit to said first source and characterized by delayed disconnection therebetween upon being rendered inoperable;
   circuit means connected to said first source and including a control switch and actuating means operative upon closure of said control switch to operate said time delay means;
   circuit interruption means operable subsequent operation of said time delay means to open said circuit means to said first source;
   and means connecting said second source to said circuit means for operating said actuating means to thereby operate said time delay means, but only during provision by said second source of a predetermined level of electrical energy.

2. A time delay circuit control system for use in combination with a load circuit and first and second sources of electrical energy, said system comprising:
   a control switch in said load circuit;
   time delay means in said load circuit operable to connect said load circuit to said first source and characterized by delayed disconnection therebetween upon being rendered inoperable;
   circuit means connected to said first source and including an actuator switch, first actuating means, second actuating means, and electrical energy storage means, said storage means being operative upon closure of said control switch to discharge and operate said second actuating means for closing said actuator switch, and said first actuating means being operative upon closure of said actuator switch to operate said time delay means, said storage means being further operative subsequent operation of said time delay means to open said circuit means to said first source;
   and means connecting said second source to said circuit means for operating said first actuating means to thereby operate said time delay means, but only during provision by said second source of a predetermined level of electrical energy.

3. A time delay circuit control system for use in combination with a load circuit and first and second sources of electrical energy, said system comprising:
   a control switch in said load circuit;
   circuit means connected to said first source and including an actuator switch, first actuating means, second actuating means, and electrical energy storage means, said first actuating means being operative upon closure of said control switch to operate said actuator switch for effecting discharge of said storage means to energize said second actuating means, said second actuating means being operative to close said load circuit to said first source and operative after said discharge to open said load circuit to said first source;
   and means connecting said second source to said second actuating means for closing said load circuit during provision by said second source to said second actuating means of a predetermined level of electrical energy.

References Cited by the Examiner
UNITED STATES PATENTS

| | | | |
|---|---|---|---|
| 2,485,727 | 10/1949 | Gallina | 307—10 |
| 2,751,507 | 6/1956 | Crum | 307—10 |
| 2,758,218 | 8/1956 | Poznik | 307—10 |
| 2,793,301 | 5/1957 | Long | 307—10 |
| 2,931,918 | 4/1960 | Shapiro | 307—10 |

ORIS L. RADER, *Primary Examiner.*

L. R. CASSETT, T. J. MADDEN, *Assistant Examiners.*